(12) United States Patent
Pletka et al.

(10) Patent No.: US 10,459,839 B1
(45) Date of Patent: Oct. 29, 2019

(54) ACCELERATING GARBAGE COLLECTION OF FLUSHED LOGICAL ERASE BLOCKS IN NON-VOLATILE MEMORY

(71) Applicant: INTERNATIONAL BUSINESS MACHINES CORPORATION, Armonk, NY (US)

(72) Inventors: Roman A. Pletka, Zurich (CH); Nikolaos Papandreou, Thalwil (CH); Sasa Tomic, Zurich (CH); Nikolas Ioannou, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/969,355

(22) Filed: May 2, 2018

(51) Int. Cl.
*G06F 12/02* (2006.01)
*G06F 3/06* (2006.01)

(52) U.S. Cl.
CPC ........ *G06F 12/0253* (2013.01); *G06F 3/0647* (2013.01); *G06F 3/0652* (2013.01); *G06F 3/0679* (2013.01); *G06F 12/0246* (2013.01); *G06F 2212/2022* (2013.01); *G06F 2212/7205* (2013.01); *G06F 2212/7211* (2013.01)

(58) Field of Classification Search
CPC ............. G06F 12/0253; G06F 12/0246; G06F 3/0647; G06F 3/0652
See application file for complete search history.

(56) References Cited

U.S. PATENT DOCUMENTS

| | | | |
|---|---|---|---|
| 7,620,769 B2 | 11/2009 | Lee et al. | |
| 8,074,011 B2 | 12/2011 | Flynn et al. | |
| 9,286,213 B2 | 3/2016 | Chun | |
| 9,588,891 B2 | 3/2017 | Atkisson et al. | |
| 2014/0289447 A9 | 9/2014 | Flynn et al. | |
| 2015/0089121 A1* | 3/2015 | Coudhury | G06F 12/0246 711/103 |
| 2015/0169237 A1 | 6/2015 | Ioannou et al. | |
| 2017/0017428 A1 | 1/2017 | Salessi et al. | |
| 2017/0177235 A1* | 6/2017 | Nishikubo | G06F 3/0659 |
| 2017/0242631 A1* | 8/2017 | Camp | G06F 11/1076 |

FOREIGN PATENT DOCUMENTS

WO 2010078545 A1 7/2010

* cited by examiner

*Primary Examiner* — Than Nguyen
(74) *Attorney, Agent, or Firm* — Brian F. Russell; Wenjie Li (57) ABSTRACT

A controller of a non-volatile memory tracks identifiers of logical erase blocks (LEBs) for which programming has closed. A first subset of the closed LEBs tracks LEBs that are ineligible for selection for garbage collection, and a second subset of the closed LEBs tracks LEBs that are eligible for selection for garbage collection. The controller continuously migrates closed LEBs from the first subset to the second subset over time. In response to closing a particular LEB, the controller places an identifier of the particular LEB into one of the first and second subsets selected based on a first amount of dummy data programmed into the closed LEBs tracked in the first subset. Thereafter, in response to selection of the particular LEB for garbage collection, the controller performs garbage collection on the particular LEB.

20 Claims, 9 Drawing Sheets

ACCELERATING GARBAGE COLLECTION OF FLUSHED LOGICAL ERASE BLOCKS IN NON-VOLATILE MEMORY

BACKGROUND OF THE INVENTION

This disclosure relates to data processing and data storage, and more specifically, to garbage collection in a non-volatile memory system. Still more particularly, the disclosure relates to techniques for accelerating garbage collection of flushed logical erase blocks in a non-volatile memory system.

NAND flash memory is an electrically programmable and erasable non-volatile memory technology that stores one or more bits of data per memory cell as a charge on the floating gate of a transistor or a similar charge trap structure. The amount of charge on the floating gate modulates the threshold voltage of the transistor. By applying a proper read voltage and measuring the amount of current, the programmed threshold voltage of the memory cell can be determined and thus the stored information can be detected. Memories storing one, two, three and four bits per cell are respectively referred to in the art as Single Level Cell (SLC), Multi-Level Cell (MLC), Three Level Cell (TLC), and Quad Level Cell (QLC) memories.

In a typical implementation, a NAND flash memory array is organized in physical blocks (also referred to as "erase blocks") of physical memory, each of which includes multiple physical pages each in turn containing a multiplicity of memory cells. By virtue of the arrangement of the word and bit lines utilized to access memory cells, flash memory arrays have generally been programmed on a physical page basis, but erased on a physical block basis. Blocks must be erased prior to being programmed.

Over time, various ones of the logical pages of data programmed into a physical block of a NAND flash memory array will be invalidated, for example, by write operations to the logical addresses of the logical pages. The invalidation of these logical pages leads to data fragmentation and the inability to use the storage capacity associated with the invalidated logical pages until the physical block is again erased and reprogrammed. This reduction in available storage capacity, if not managed appropriately, can in turn reduce overprovisioning and undesirably increase write amplification. In order to recover the use of the storage capacity associated with invalidated logical pages, a conventional flash controller regularly performs "garbage collection," which includes the controller collecting the still valid logical pages from one or more fragmented blocks, programming an available erased block with the valid logical pages, and then erasing the fragmented block(s) in preparation for re-use.

BRIEF SUMMARY

In some prior art systems, one or more physical blocks have been jointly managed for data placement and garbage collection. These groups of physical blocks, which can be formed, for example, of stripes of blocks selected across a plurality of memory channels, are referred to as logical erase blocks (LEBs). In the prior art, LEBs (and their constituent physical blocks) were not eligible for garbage collection until the LEBs were completed (i.e., all physical pages programmed) and had experienced at least one logical page invalidation. Further, in prior art systems that use a delay queue pool, LEBs were not eligible for garbage collection after the first logical page invalidation until a certain number of write requests were processed or a certain amount of time elapsed.

The present application recognizes, however, that mandating a delay in garbage collection for a LEB until it is fully programmed and experiences at least one page invalidation greatly reduces overprovisioning. It also recognizes that any additional delay to prevent garbage collection after experiencing at least one logical page invalidation reduces overprovisioning even further. This effect is particularly pronounced in memory technologies like 3D NAND flash memory, which can require some LEBs to be flushed (i.e., written with dummy data) rather than completed with valid host data in order to mitigate certain cell-to-cell interference characteristics of the memory.

Accordingly, in various embodiments disclosed herein, garbage collection of flushed LEBs containing dummy data is accelerated. In at least one embodiment, a controller of a non-volatile memory tracks identifiers of logical erase blocks (LEBs) for which programming has closed. A first subset of the closed LEBs tracks LEBs that are ineligible for selection for garbage collection, and a second subset of the closed LEBs tracks LEBs that are eligible for selection for garbage collection. The controller continuously migrates closed LEBs from the first subset to the second subset over time. In response to closing a particular LEB, the controller places an identifier of the particular LEB into one of the first and second subsets selected based on a first amount of dummy data programmed into the closed LEBs tracked in the first subset. Thereafter, in response to selection of the particular LEB for garbage collection, the controller performs garbage collection on the particular LEB.

DETAILED DESCRIPTION

Figure 1A:
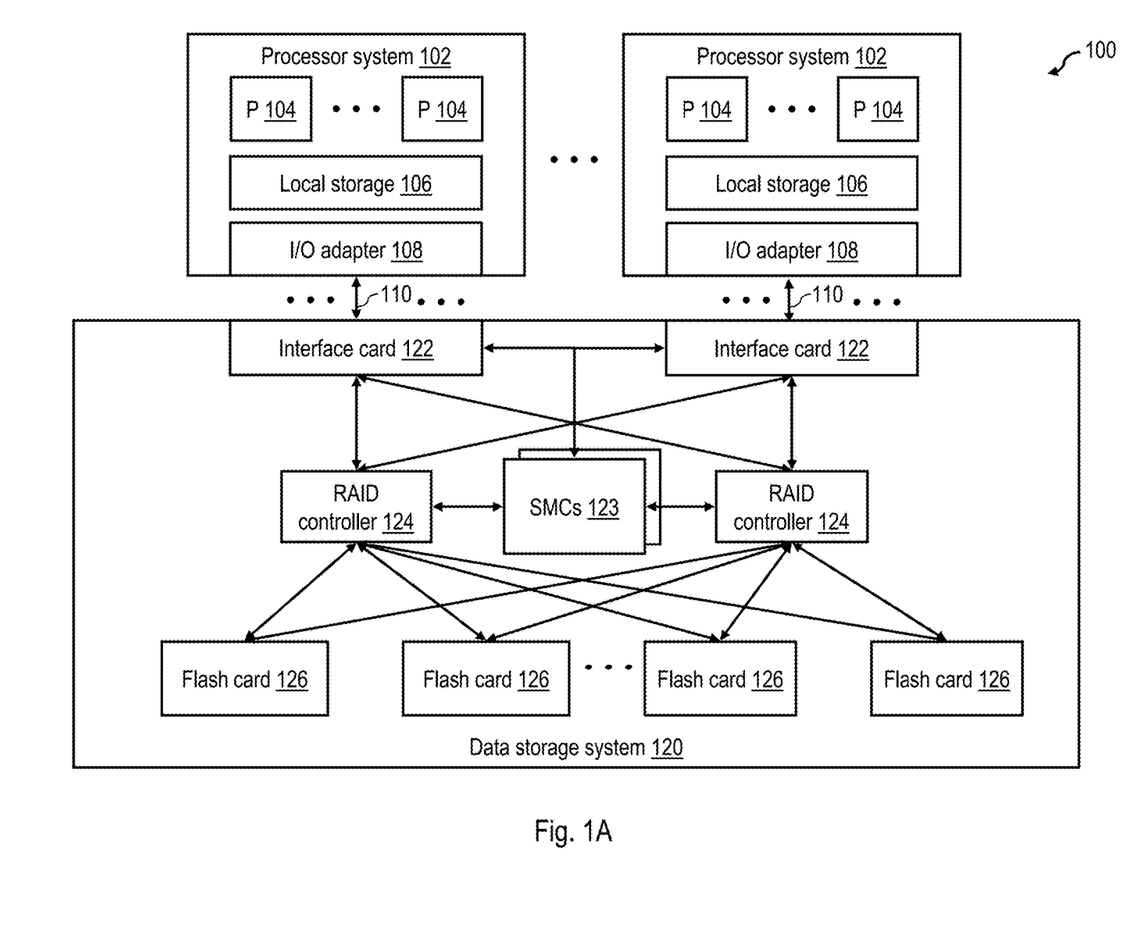
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. A processor system 102 may additionally include local storage 106 (e.g., dynamic random access memory (DRAM) or disks) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, POWER, Intel x86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In some embodiments, data storage system 120 may be integral to a processor system 102. In various embodiments, I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O requests communicated via I/O channel 110 include host read requests by which a processor system 102 requests data from data storage system 120 and host write requests by which a processor system 102 requests storage of data in data storage system 120.

Although not required, in the illustrated embodiment, data storage system 120 includes multiple interface cards 122 through which data storage system 120 receives and responds to I/O requests of hosts via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to non-volatile storage media, which in the illustrated example include multiple flash cards 126 bearing NAND flash memory. In other embodiments, alternative and/or additional non-volatile storage devices can be employed.

In the depicted embodiment, the operation of data storage system 120 is managed by redundant system management controllers (SMCs) 123, which are coupled to interface cards 122 and RAID controllers 124. In various embodiments, system management controller 123 can be implemented utilizing hardware or hardware executing firmware and/or software.

Figure 1B:
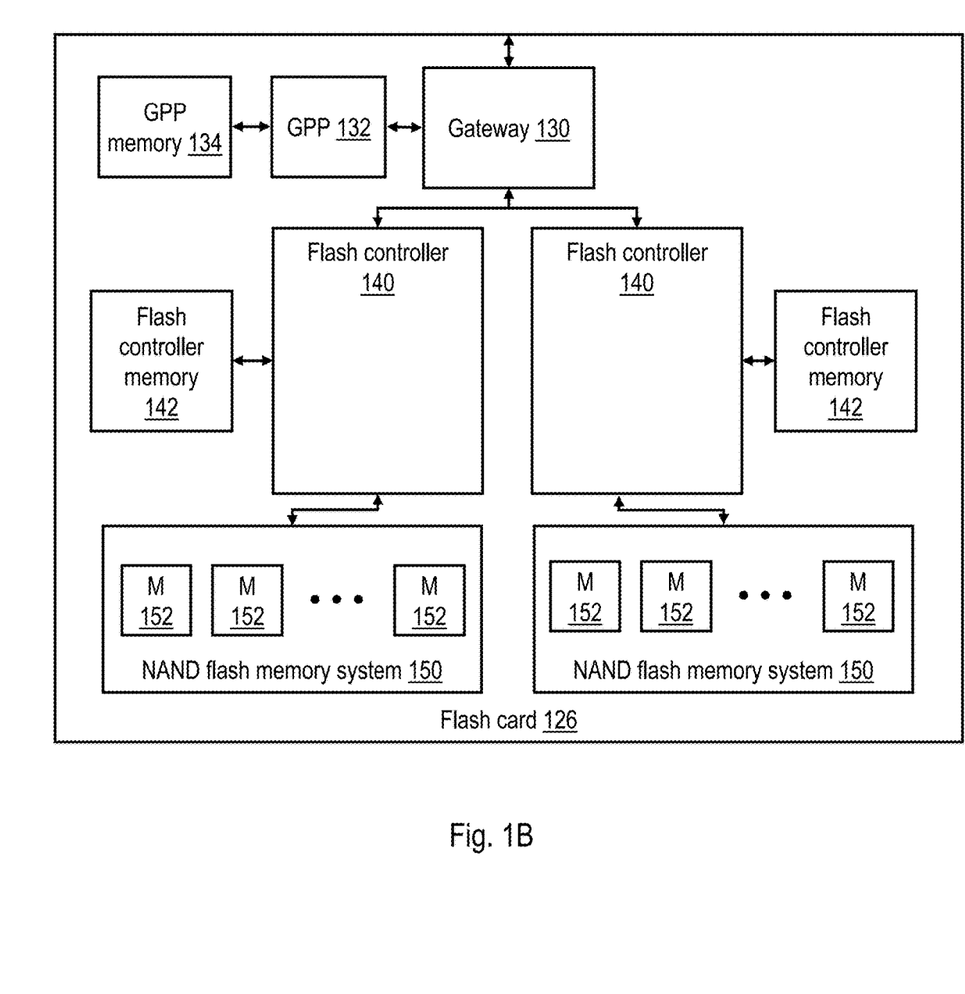
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on requests received by gateway 130 and/or to schedule servicing of the requests by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or a Field Programmable Gate Array (FPGA) and/or a microprocessor, and each have an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive host read and write requests from gateway 130 that request to read data stored in NAND flash memory system 150 and/or to store data in NAND flash memory system 150. Flash controllers 140 service these requests, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. In general, a request received by flash controller 140 from a host device, such as a processor system 102, contains the logical block address (LBA) at which the data is to be accessed (read or written) and, if a write request, the write data to be stored to data storage system 120. The request may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of a board-mounted flash memory modules, for example, Multi-Level Cell (MLC), Three Level Cell (TLC), or Quad Level Cell (QLC) NAND flash memory modules. The effective storage capacity provided by flash memory storage devices 152 can be increased through the implementation of data compression, for example, by flash controllers 140 and/or high level controllers, such as GPPs 132, RAID controllers 124 or SMCs 123.

Figure 2:
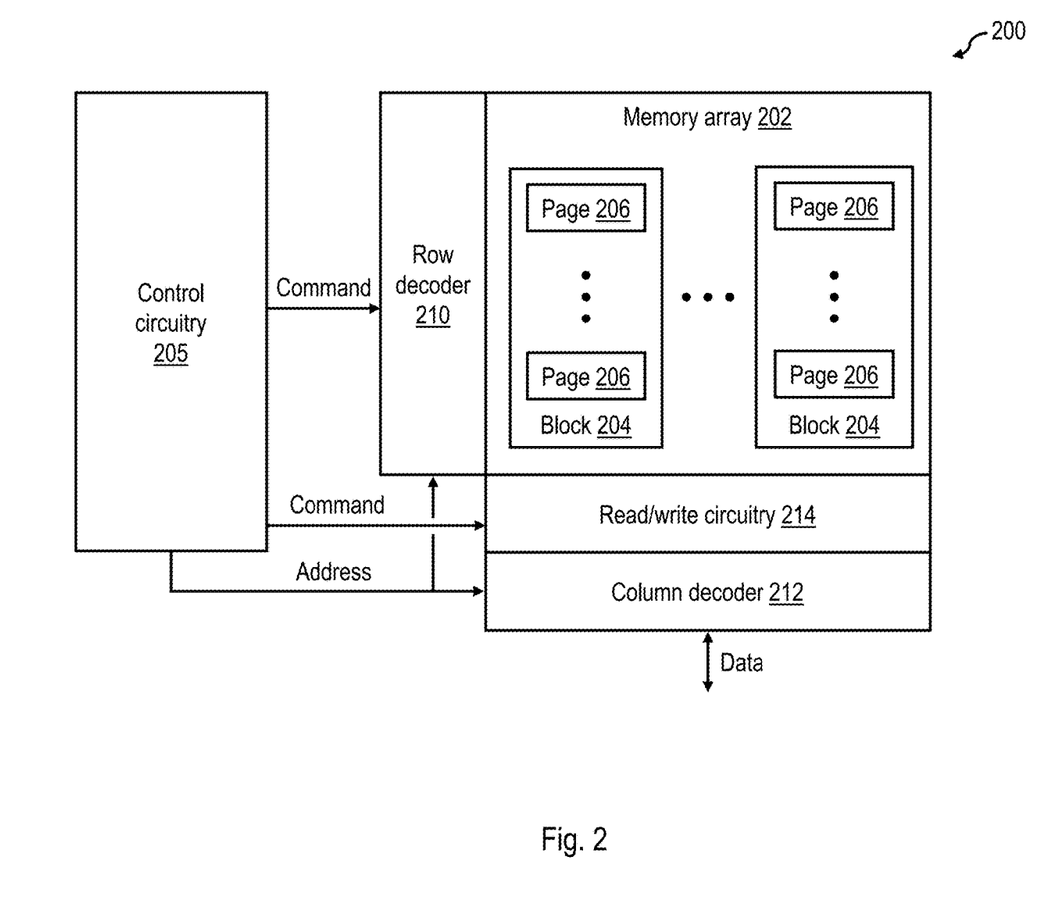
FIG. 2 depicts an exemplary NAND flash memory module in accordance with one embodiment.

Referring now to FIG. 2, there is depicted a block diagram of an exemplary flash memory module 200 that can be utilized to implement any of the NAND flash memory storage devices 152 of FIG. 1B. Flash memory module 200 includes one or more memory die, each implementing at least one memory array 202 formed of a two-dimensional or three-dimensional array of NAND flash memory cells. As indicated in FIG. 2, the memory cells within memory array 202 are physically arranged in multiple blocks 204, each in turn including multiple physical pages 206. These physical pages can be managed in page groups, which can each be formed, for example, of all the pages coupled to a common wordline, of all pages in one or more layers in a 3D NAND flash, of a set of pages in one or more layers, or generally of pages with similar characteristics.

As is known to those skilled in the art, NAND flash memory, such as that employed in memory array 202, must be erased prior to being programmed. Further, NAND flash memory can be (but is not required to be) constrained by its construction such that the smallest granule of storage that can be erased is a block 204 and the smallest granule of storage that can be accessed by a read or write request is fixed at the size of a single physical page 206. It should be appreciated in this regard that the LBAs provided by host devices correspond to logical pages within a logical address space, where each logical page typically has a size of 4 kilobytes (kB). Physical pages 206, in contrast, typically have a larger size, for example, 16 kB, and can thus store multiple logical pages.

Flash memory module 200 further includes a row decoder 210 through which word lines of memory array 202 can be addressed and a column decoder 212 through which bit lines of memory array 202 can be addressed. In addition, flash memory module 200 includes read/write circuitry 214 that enables the memory cells of a physical page 206 to be programmed or read in parallel. Flash controller 200 additionally includes control circuitry 205 that provides chip-level control of operation of memory array 202, including read and write accesses made to physical pages 206 in memory array 202, erasure of blocks 204, and the amplitude, duration and polarity of related voltages applied to memory array 202.

Having described the general physical structure of one exemplary embodiment of a data storage system 120, certain operational aspects of data storage system 120 are now described with reference to FIG. 3, which is a high level flow diagram of the flash management functions and data structures employed by a GPP 132 and/or flash controller 140 in accordance with one embodiment.

Data storage system 120 does not generally allow external devices (e.g., hosts) to directly address and/or access the physical memory locations within NAND flash memory systems 150. Instead, data storage system 120 is generally configured to present to host devices one or more logical volumes each having a contiguous logical address space, thus allowing host devices to read and write data to and from logical block addresses (LBAs) within the logical address space while permitting one or more of the various levels of controllers (e.g., system management controller 123, RAID controllers 124, flash controllers 140 and GPP 132) to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 performs logical-to-physical address translation for an associated set of LBAs using a logical-to-physical address translation data structure, such as logical-to-physical translation (LPT) table 300, which can be stored, for example, in the associated flash controller memory 142. It should be noted that the logical address supplied to flash controller(s) 140 may be different from the logical address originally supplied to data storage system 120, since various components within data storage system 120 may perform address translation operations between the external devices and the flash controller(s) 140.

Flash management code running on the GPP 132 tracks erased blocks of NAND flash memory system 150 that are ready to be used in ready-to-use (RTU) queues 306, which may be stored, for example, in GPP memory 134. In the depicted embodiment, flash management code running on the GPP 132 maintains one RTU queue 306 per channel (i.e., per data bus), and an identifier of each erased block that is to be reused is enqueued in the RTU queue 306 corresponding to its channel. A build block stripes function 320 performed by flash management code running on the GPP 132 constructs new block stripes for storing data and associated parity information from the erased blocks enqueued in RTU queues 306. The new block stripes are then queued to the flash controller 140 for data placement. Block stripes are preferably formed of one or more physical blocks residing in different channels, meaning that build block stripes function 320 can conveniently construct a block stripe by drawing each block of the new block stripe from a different RTU queue 306. In general, build block stripes function 320 attempts to construct stripes from blocks of approximately equal health (i.e., expected remaining useful life). Because all of the physical block(s) composing a block stripe are generally managed together as a unit for programming and erasure, a block stripe is also referred to herein as a logical erase block (LEB).

In response to write request received from a host, such as a processor system 102, a data placement function 310 of flash controller 140 determines by reference to LPT table 300 whether the target LBA(s) indicated in the write request is/are currently mapped to physical memory page(s) in NAND flash memory system 150 and, if so, changes the status of each data page currently associated with a target LBA to indicate that the associated data is no longer valid. In addition, data placement function 310 allocates a page stripe if necessary to store the write data of the write request and any non-updated data (i.e., for write requests smaller than a logical page, the remaining valid data from a previous write to the same logical address which is not being overwritten and which must be handled in a read-modify-write manner) from an existing page stripe, if any, targeted by the write request, and/or stores the write data of the write request and any non-updated (i.e., still valid) data from an existing page stripe, if any, targeted by the write request to an already allocated page stripe which has free space left. The page stripe may be allocated from either a block stripe already allocated to hold data or from a new block stripe built by build block stripes function 320. In a preferred embodiment, the page stripe allocation can be based on the health of the blocks available for allocation and the "heat" (i.e., estimated or measured write access frequency) of the LBA of the write data. Data placement function 310 then writes the write data, associated metadata (e.g., cyclic redundancy code (CRC) and error correcting code (ECC) values), and parity information for the page stripe in the allocated page stripe. Flash controller 140 also updates LPT table 300 to associate the physical page(s) utilized to store the write data with the LBA(s) indicated by the host device. Thereafter, flash controller 140 can access the data to service host read requests by reference to LPT table 300 as further illustrated in FIG. 3.

Once programming of physical pages in a block stripe has closed, flash controller 140 places an identifier of the block stripe into one of the pools in the occupied block stripe pools 302, which flash management code running on the GPP 132 utilizes to facilitate garbage collection. As noted above, through the write process, logical pages are invalidated, and therefore portions of the NAND flash memory system 150 become unused. The associated flash controller 140 (and/or GPP 132) eventually needs to reclaim this space through garbage collection performed by a garbage collector 312. Garbage collector 312 selects particular block stripes for garbage collection based on a number of factors including, for example, the health of the physical blocks 204 within the block stripes, the amount of dummy data (if any) in the block stripes, and how much of the data within the erase blocks 204 is invalid. In the illustrated example, garbage collection is performed on entire block stripes (or LEBs), and flash management code running on GPP 132 logs identifiers of the block stripes ready to be recycled in a relocation queue 304, which can conveniently be implemented in the associated flash controller memory 142 or GPP memory 134.

The flash management functions performed by GPP 132 or flash controller 140 additionally include a relocation function 314 that relocates the data held in block stripes enqueued in relocation queue 304. To relocate such data, relocation function 314 issues relocation write requests to data placement function 310 to request that the valid data of the old block stripe be written to a new block stripe in NAND flash memory system 150. In addition, relocation function 314 updates LPT table 300 to remove the current association between the logical and physical addresses of the data Once all remaining valid data has been moved from the old block stripe, the old block stripe is passed to dissolve block stripes function 316, which decomposes the old block stripe into its constituent physical blocks 204, thus disassociating the physical blocks 204. Each of the physical blocks 204 formerly forming the dissolved block stripe is then erased under the direction of flash controller 140 and/or the control circuitry 205 of the relevant flash memory module 200, and a corresponding program/erase (P/E) cycle count 334 for each erased block is incremented. Based on the health metrics of each erased block 204 (e.g., bit error rate (BER) metrics, uncorrectable errors, P/E cycle count, etc.), each erased block 204 is either retired (i.e., withdrawn from use) by a block retirement function 318 among the flash management functions executed on GPP 132, or alternatively, prepared for reuse by placing the block 204 on the appropriate ready-to-use (RTU) queue 306 in the associated GPP memory 134.

Figure 3:
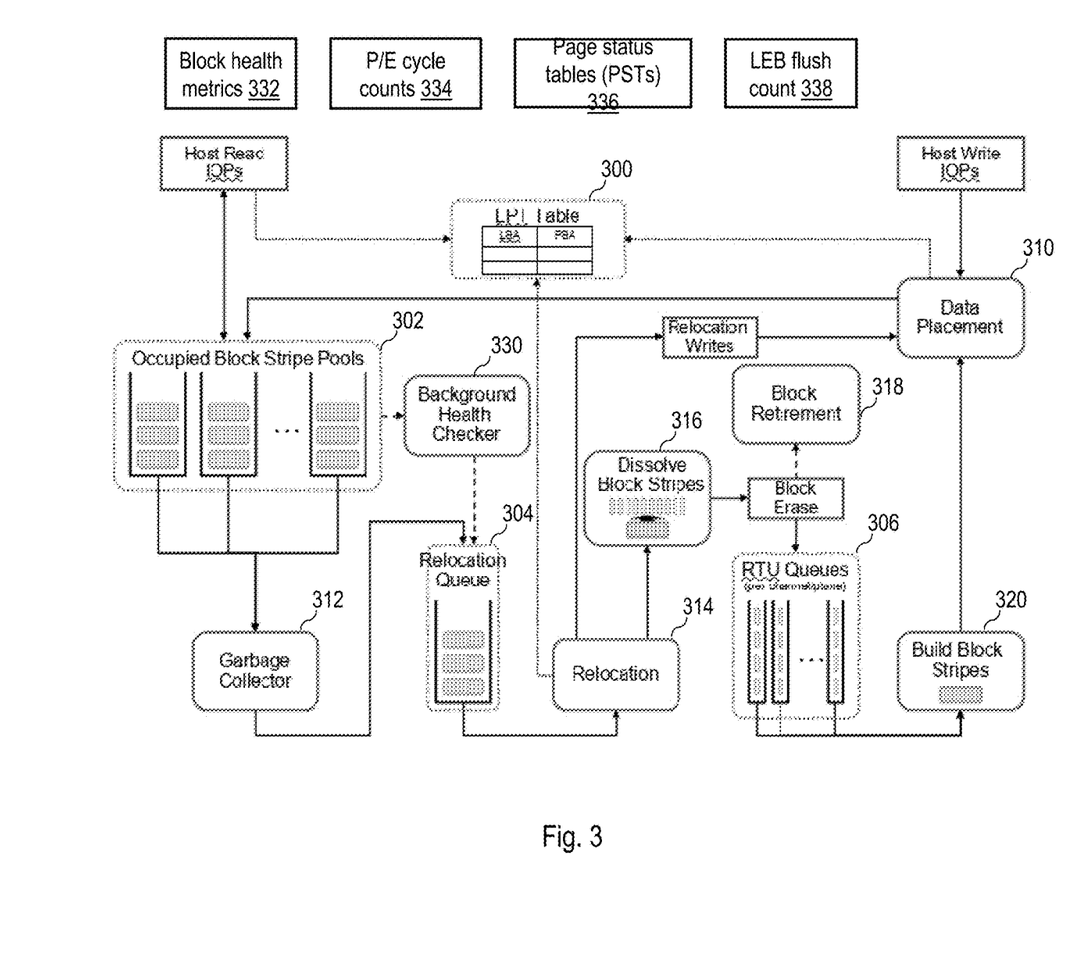
FIG. 3 is a high level flow diagram of the flash management functions and data structures employed in flash management in accordance with one embodiment.

As further shown in FIG. 3, the flash management functions executed on GPP 132 and/or flash controller 140 additionally include a background health checker 330. Background health checker 330, which operates independently of the read and write requests of hosts such as processor systems 102, continuously determines one or more block health metrics 332 for physical blocks 204 belonging to block stripes recorded in occupied block stripe pools 302. Based on the one or more of the block health metrics 332, a wear leveling function 406 within background health checker 330 (see, e.g., FIG. 4) places block stripes on relocation queue 304 for handling by relocation function 314. Key block health metrics 332 preferably monitored and recorded by background health checker 330 relate to the bit error rate (BER) metrics observed for valid blocks and physical pages, and may include, for example, the worst page BER of each block, the mean page BER of each block, the rates of change of the worst page BER and mean page BER of each block, etc. In order to obtain the most accurate health estimate possible, a health grade can be determined from an analysis of valid and invalid data, thereby ensuring that blocks containing almost entirely invalid data are fully analyzed to determine overall block health.

In a typical implementation, data placement function 310 may maintain a plurality of open LEBs that are subject to additional programming. For example, data placement function 310 may maintain at least one open LEB in each of a plurality of possible health grades (e.g., 4, 8, or 16) that can be assigned to the physical blocks by background health checker 330. One issue that arises in some newer non-volatile memory technologies, such as 3D NAND flash, is that reading data from a LEB that has not been closed (i.e., for which programming of all pages on the same word-line has not been completed) leads to higher BER at the interface between programmed and non-programmed physical pages. The interface region may include all shared physical pages (i.e., physical pages connected to the same word-line) in a physical block that are only partially programmed. For example, a shared physical page of TLC NAND flash, which includes lower, upper, and extra pages, may have only the lower page or may have the lower and upper pages programmed, but not the extra page. In certain chips the interface region may be, for example, 48 pages wide. Thus, under normal operating conditions, it is common for one or more LEBs to be partially programmed.

One strategy to address the increase in the BER attributable to excessive reads to open LEBs is for a flash controller 140 to flush an entire LEB when the number of reads to the already programmed physical pages of the LEB exceeds an open LEB read threshold. To flush the LEB, data placement function 310 of a flash controller 140 writes arbitrary (dummy) data, such as a pseudo-random data and/or a scrambling pattern, into all remaining non-programmed physical pages of the LEB and then closes programming of the LEB. Alternatively, flash controller 140 writes arbitrary (dummy) data only to all remaining non-programmed physical pages associated with a word-line having at least one page programmed with valid data. In this case, word-lines that have no valid data need not be programmed and therefore can be skipped to reduce the overhead of flushing. Consequently, a flushed LEB may hold valid and invalid data pages, pages holding dummy data, as well as unprogrammed pages. The present disclosure recognizes, however, that frequent flushing of LEBs can result in a large amount of storage capacity being consumed that does not hold any host data and can therefore artificially reduce overprovisioning. Reduced overprovisioning results in an increase in write amplification and may ultimately lead to a device write failure when all overprovisioning is utilized. In order to promote flushing of LEBs to avoid excessive BERs attributable to reading from open LEBs while avoiding a too great reduction in overprovisioning, the present disclosure provides improved management of LEBs for which programming is closed.

Figure 4:
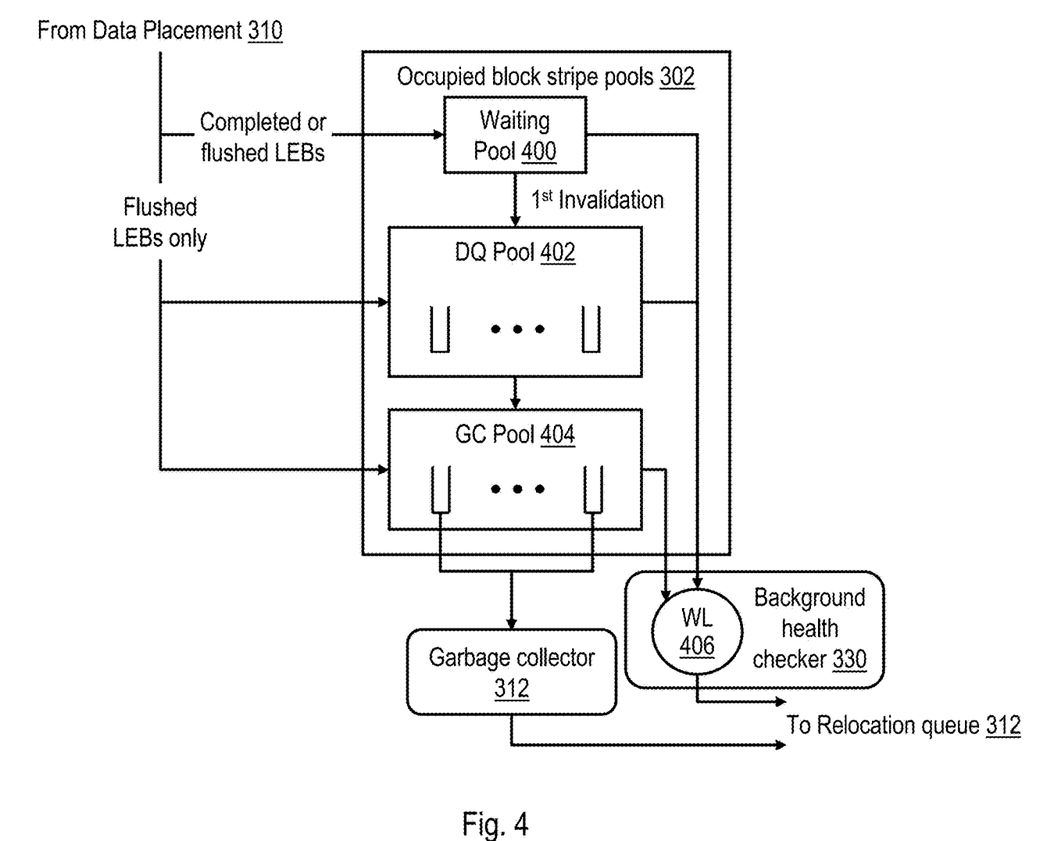
FIG. 4 depicts a more detailed view of the occupied block stripe pools of FIG. 3 in accordance with one embodiment.

Referring now to FIG. 4, there is depicted a more detailed view of an exemplary embodiment of the occupied block stripe pools 302 utilized to track subsets of LEBs for which programming by data placement function 310 has closed. As shown, in this embodiment, occupied block stripe pools 302 include three data structures, including a waiting pool 400, a delay queue (DQ) pool 402, and a garbage collection (GC) pool 404, each of which tracks a respective subset of the closed LEBs.

Waiting pool 400 buffers identifiers (e.g., pointers, block IDs, and/or addresses) of LEBs for which programming by data placement 310 has closed, but in which no host data has yet been invalidated. As indicated in FIG. 4, these LEBs may be completed (i.e., all physical pages programmed with at least one valid logical page of data) or flushed (i.e., at least one physical page programmed with dummy data prior to being closed).

DQ pool 402 buffers identifiers of LEBs that are closer to garbage collection than the LEBs whose identifiers are buffered in waiting pool 400. In one preferred embodiment, DQ pool 402 includes a respective queue associated with each possible block health grade. Because LEBs are preferably formed of physical blocks of the same or approximately the same health grade, the identifiers of LEBs can be queued to the appropriate queues within DQ pool 402 based on the block health determined by background health checker 330. As shown, the identifier of a LEB is preferably migrated from waiting pool 400 to DQ pool 402 upon the first (or more generally, the nth) invalidation of a logical page within the LEB. Data placement function 310 may also directly insert identifiers of flushed LEBs into DQ pool 402, as discussed further below with reference to FIG. 6.

GC pool 404 buffers identifiers of LEBs that are immediately eligible for garbage collection and thus which are available for garbage collection in contrast to the LEBs whose identifiers are buffered in waiting pool 400 and DQ pool 402. In one preferred embodiment, GC pool 404 is constructed similarly to DQ pool 402 and includes a respective queue for LEBs of each possible block health grade or a respective queue for a given range of number of invalid pages in the LEB. The identifier of a LEB is preferably migrated from one of the queues in DQ pool 402 to a corresponding queue in GC pool 404 when the queue in DQ pool 402 reaches a queue full threshold. Data placement function 310 may also directly insert identifiers of flushed LEBs into GC pool 404, as discussed further below with reference to FIG. 6.

FIG. 4 further depicts that each of waiting pool 400, DQ pool 402, and GC pool 404 is logically coupled to a wear leveler (WL) function 406, which can be implemented, for example, in background health checker 330. At any time, WL function 406 may remove an identifier of a LEB from waiting pool 400, DQ pool 402, or GC pool 404 and queue the identifier in relocation queue 304 for subsequent data relocation and erasure. This wear leveling is typically implemented to ensure that LEBs do not exceed their maximum data retention time or if the LEB is at risk for an excessive BER due to a high number of reads to the LEB. In general, the rate at which LEBs are selected by WL function 406 is extremely low given that the maximum data retention time may be on the order of months and hundreds of thousands or millions of reads to the same physical block may be needed to increase the BER enough to warrant relocation.

Figure 5:
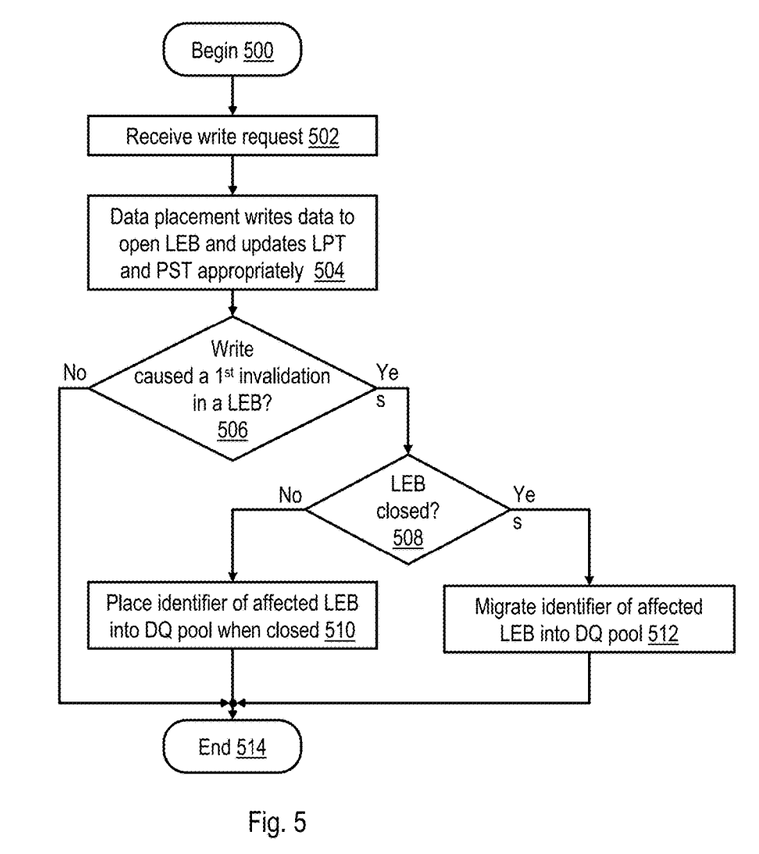
FIG. 5 is a high level logical flowchart of an exemplary process for servicing a write request in accordance with one embodiment.

With reference now to FIG. 5, there is illustrated a high level logical flowchart of an exemplary process for servicing a host write request in accordance with one embodiment. The illustrated process as well as those depicted in FIGS. 6-7 may be performed, for example, in hardware, software, firmware, and/or a combination thereof by flash controller 140 and/or GPP 132, each or both of which may be referred to herein generally as a "controller." For ease of discussion, the processes of FIG. 5-7 will be described as being performed by flash controller 140.

The process of FIG. 5 begins at block 500 and then proceeds to block 502, which illustrates flash controller 140 receiving a host write request, which specifies a logical address and one or more logical pages of data to be written to the memory space. In response to receipt of the host write request, data placement function 310 of flash controller 140 writes the logical page(s) of data into one of the available open LEBs and updates LPT table 300 to associate the logical address of the logical page(s) with the physical page to which the logical page(s) was/were written (block 504). In addition, at block 504 flash controller 140 also verifies, if a previous logical-to-physical mapping exists for the logical address of the logical page in LPT table 300, and if so, invalidates the prior logical-to-physical mapping. As further indicated at block 504, flash controller 140 also preferably updates a page status table (PST) 336 for the physical page programmed at block 504 as well as the physical page containing any logical page invalidated at block 504 to indicate a number of valid logical pages currently held in those physical pages. An exemplary embodiment of a per-block PST 336 is given in FIG. 8, which is described below.

At block 506, flash controller 140 additionally determines whether or not servicing the host write request at block 504 entailed the invalidation of a logical page, which was the first (or more generally, the nth) invalidation in a LEB (whether the LEB being programmed or another LEB) in the LEB's current program/erase (P/E) cycle. This information may be tracked, for example, by a metadata flag associated with each LEB. In response to a negative determination at block 506, the process of FIG. 5 ends at block 514. If, however, flash controller 140 determines at block 506 that servicing the write request at block 504 entailed the invalidation of a logical page that was the first (or more generally, the nth) invalidation in a LEB, flash controller 140 designates the affected LEB for insertion into DQ pool 402. In particular, as shown at block 508, flash controller 140 determines if the LEB experiencing the first invalidation in its current P/E cycle has been closed. If not, flash controller 140 marks the affected LEB and subsequently places the identifier of the affected LEB into DQ pool 402 when programming of the LEB is closed (block 510). Alternatively, if programming of the LEB is closed, meaning that the identifier of the LEB is already in waiting pool 400, flash controller 140 migrates the identifier of the LEB from waiting pool 400 to DQ pool 402 (block 512). Following either block 510 or block 512, the process of FIG. 5 ends at block 514 until flash controller 140 receives a subsequent host write request.

Figure 6:
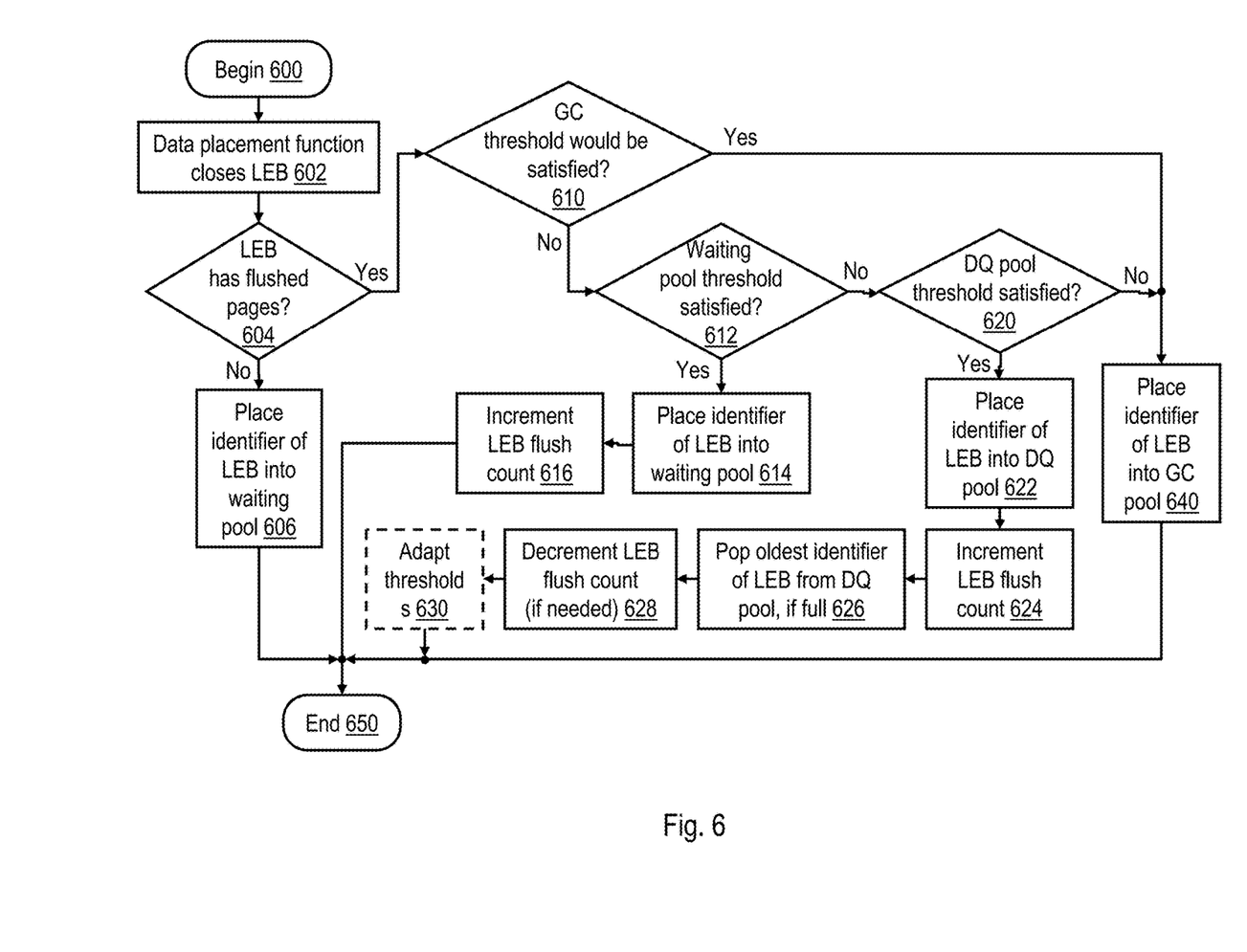
FIG. 6 is a high level logical flowchart of an exemplary process for closing an open logical erase block (LEB) and transferring its identifier to the appropriate occupied block stripe pool in accordance with one embodiment.

Referring now to FIG. 6, there is depicted a high level logical flowchart of an exemplary process for closing an open LEB and transferring its identifier to the appropriate occupied block stripe pools in accordance with one embodiment. The process of FIG. 6 begins at block 600 and then proceeds to block 602, which illustrates data placement function 310 closing a LEB that was being programmed. As indicated above, data placement function 310 may close the LEB in response to all of the available physical pages in the LEB being programmed with logical pages of data (i.e., the LEB being completed) or data placement function 310 electing to close the LEB prior to the LEB being completed, for example, by programming one or more physical pages of the LEB with dummy data in order to mitigate the potential read disturb effects of reads to the open LEB.

Figure 8:
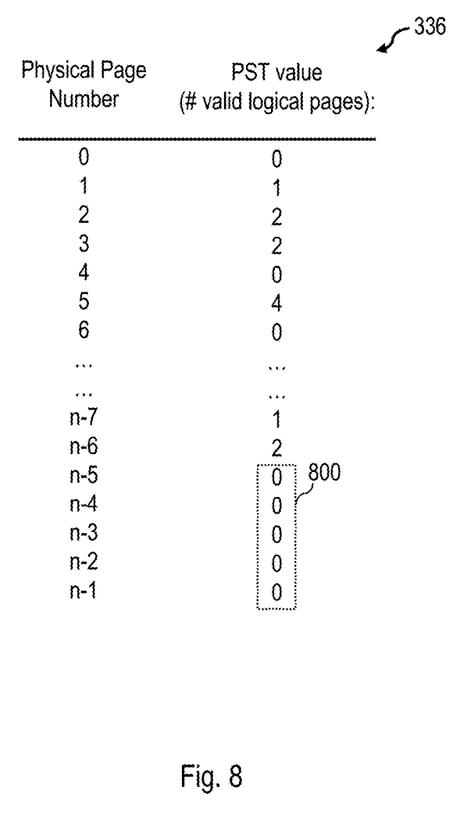
FIG. 8 depicts a technique for determining a number of flushed pages in a physical block in accordance with one embodiment.

At block 604, flash controller 140 determines whether or not the LEB closed at block 602 includes any flushed physical pages containing dummy data. FIG. 8 illustrates one technique by which flash controller 140 may infer the presence of flushed physical pages in the LEB using the PST 336 of a given block with n physical pages. The PST 336 holds an entry for each physical page in the block denoting the PST value that corresponds to the number of valid logical pages stored in the physical page. In particular, because in a typical implementation flash controller 140 programs the physical pages of each physical block in a predetermined sequence (assumed here to correspond to the sequence of the physical page numbers), the signature of a physical block that contains flushed physical pages is one whose PST 336 begins with one or more physical pages including zero or more valid logical pages and ends with a continuous sequence 800 of physical pages containing no valid logical pages. Thus, in this embodiment, flash controller 140 determines at block 604 that the LEB includes flushed pages if the LEB includes at least one physical block having the distinctive signature shown in FIG. 8. Note that by using this inference technique the detection of a flushed block may not always be correct. However, it is an excellent approximation as it is unlikely that many logical pages stored consecutively in physical pages at the end of the block are invalidated when the LEB is closed due to data striping over multiple cards and channels inside cards. Further, flushed and invalidated pages both accumulate storage locations that currently cannot be used. Therefore, a potentially different placement of such stripes can be beneficial in both cases. A side effect of this inference technique may result in the first (or more generally, the nth) invalidation being considered as a flushed page when it happened in the continuous sequence 800 before determining the presence of flushed physical pages in the LEB in block 604. Consequently, the flash controller will then consider the first (or more generally, the nth) invalidation outside the sequence 800 as the first (or the nth) invalidation.

In response to a negative determination at block 604, flash controller 140 places an identifier of the closed LEB into waiting pool 400 (block 606). Clearly, the LEB may have already seen a first (or more generally, the nth) invalidation upon which flash controller 140 places the LEB into DQ pool 402 (not shown in FIG. 6). Thereafter, the process of FIG. 6 ends at block 650. If, however, flash controller 140 determines at block 604 that the LEB closed at block 602 includes flushed physical pages, the process proceeds from block 604 to block 610, which depicts flash controller 140 determining if a GC threshold, which specifies a maximum number of flushed physical pages that can reside in both waiting pool 400 and DQ pool 402, would be satisfied (e.g., exceeded) if the LEB were inserted into either waiting pool 400 or DQ pool 402. Flash controller 140 can make the determination illustrated at block 610, for example, by comparing, with the GC threshold, the sum of the number of flushed physical pages in the LEB closed at block 602 and flush count 338, which indicates the number of flushed physical pages in all LEBs identified in waiting pool 400 and DQ pool 402.

In response to an affirmative determination at block 610, flash controller 140 places the identifier of the closed LEB directly into GC pool 404, making the LEB (which contains one or more flushed physical pages) immediately eligible for garbage collection despite the fact that programming of the LEB has just closed. Thereafter, the process of FIG. 6 ends at block 650. If, however, flash controller 140 makes a determination at block 610 that the GC threshold would not be satisfied by the insertion of the LEB into waiting pool 400 or DQ pool 402, flash controller 140 makes the determinations depicted at block 612 and 620 in order to select into which data structure within occupied block stripe pools 302 an identifier of the LEB will be inserted.

Referring now to block 612, flash controller 140 determines whether or not the LEB satisfies a waiting pool threshold specifying a minimum number of physical pages containing valid logical pages (e.g., 95% of the physical pages of the physical blocks composing the LEB). If so, meaning that the closed LEB includes enough valid host data to defer its eligibility for garbage collection by placing its identifier in waiting pool 400 until a first invalidation is received, flash controller 140 places the identifier of the closed LEB into waiting pool 400 (block 614) and increments LEB flush count 338 by the number of flushed physical pages in the LEB (block 616). Thereafter, the process of FIG. 6 ends at block 650.

If flash controller 140 determines at block 612 not to place the identifier of the LEB in waiting pool 400 due to the presence of too many flushed physical pages or the LEB has already experienced a first (or more generally, the nth) invalidation, flash controller 140 determines at block 620 whether or not the LEB satisfies a DQ pool threshold specifying an intermediate number of physical pages containing valid logical pages (e.g., 80% of the physical pages of the physical blocks composing the LEB). If so, meaning that the closed LEB includes enough valid host data to defer its eligibility for garbage collection by placing its identifier in DQ pool 402, flash controller 140 places the identifier of the closed LEB into DQ pool 402 (block 622) and increments LEB flush count 338 by the number of flushed physical pages in the LEB (block 624). As indicated at block 626, if insertion of the identifier of the LEB into one of the queues in DQ pool 402 causes that queue to fill, the oldest LEB identified in that queue has completed its aging phase. Accordingly, flash controller 140 pops the identifier of the oldest LEB from the full DQ and places it into the relevant queue in GC pool 404 (block 626). If the LEB associated with an identifier dequeued from DQ pool 402 at block 626 holds one or more flushed physical pages, flash controller 140 also decrements LEB flush count 338 by the appropriate number of flushed physical pages (block 628).

As indicated at block 630, flash controller 140 may also optionally elect to update any of the GC threshold, waiting pool threshold, or DQ pool threshold. In at least one embodiment, flash controller 140 can set and/or adapt any of these threshold based, for example, on a desired amount of over-provisioning and/or a maximum allowed write amplification. Following block 630 (or block 628 if block 630 is omitted), the process of FIG. 6 ends at block 650.

Returning to block 620, in response to flash controller 140 determining that the newly closed LEB includes too many flushed physical pages to satisfy the DQ pool threshold, flash controller 140 bypasses waiting pool 400 and DQ pool 402 and inserts the identifier of the LEB directly into GC pool 404, making the LEB immediately eligible for garbage collection (block 640). Following block 640, the process of FIG. 6 ends at block 650.

Those skilled in the art will appreciate that in other embodiments of the process given in FIG. 6, the order in which flash controller 140 checks whether the various thresholds are satisfied can vary. Further, in some embodiments, a greater or fewer number of thresholds may be employed.

Figure 7:
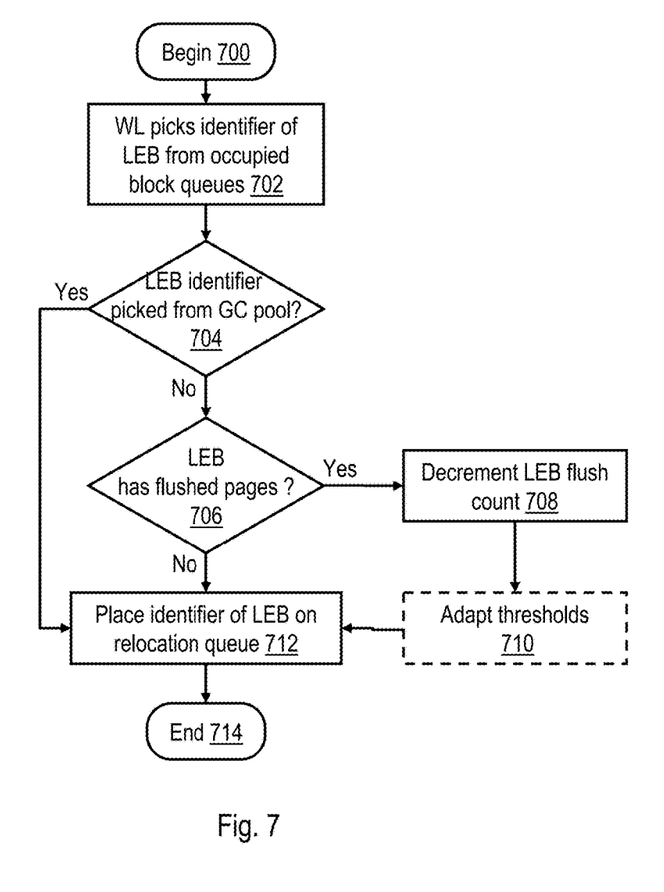
FIG. 7 is a high level logical flowchart of an exemplary process for wear leveling in accordance with one embodiment.

With reference now to FIG. 7, there is illustrated a high level logical flowchart of an exemplary process for wear leveling in accordance with one embodiment. The process begins at block 700 and then proceeds to block 702, which illustrates wear leveling function 406 selecting the identifier of a LEB from occupied block stripe pools 302, for example, based on one or more of the block health metrics 332 associated with physical blocks in the LEB. The selection may be made, for example, to mitigate data retention or read disturb effects, as is known in the art. As shown at block 704, if the identifier of the LEB is picked from GC pool 404, the process then proceeds to block 712, which is described below.

However, if the identifier of the LEB is selected from waiting pool 400 or DQ pool 402, flash controller 140 determines at block 706 whether or not the LEB selected by wear leveling function 406 has one or more flushed physical pages. If not, the process passes to block 712, which is described below. However, if the selected LEB has one or more flushed physical pages, flash controller 140 decrements LEB flush count 338 by the appropriate number of physical pages (block 708). As indicated at block 710, flash controller 140 may also optionally adapt one or more of the GC threshold, waiting pool threshold, and/or DQ pool threshold, for example, based on overprovisioning and/or write amplification. The process then proceeds to block 712.

At block 712, flash controller 140 places the selected LEB identifier on relocation queue 304 to force the relocation of the remaining valid logical pages stored in the LEB, dissolution of the LEB, and erasure of the LEB's constituent physical blocks. Thereafter, the process of FIG. 7 ends at block 714.

As has been described, a controller of a non-volatile memory flushes LEBs, for example, in response to any block in an open LEB undergoing data placement exceeding a predetermined number of reads while not yet fully programmed. The flushing operation may include writing all remaining non-programmed physical pages in the LEB with arbitrary data (e.g., pseudo-random or generated scrambled data) or only writing a certain number of physical pages with arbitrary data. After completion of the flush write operations, an identifier of the LEB is placed into one of multiple subsets, at least one of which tracks LEBs ineligible for garbage collection and at least one of which tracks LEBs eligible for garbage collection.

While the identifiers of programmed LEBs are tracked in the subsets, a count of flushed physical pages in the LEBs not currently eligible for garbage collection is maintained. Based on one or more threshold values of this count and/or the number of flushed pages in closed LEBs, identifiers of closed LEBs are inserted into various ones of the subsets. As a result, LEBs with valid, invalid, and flushed physical pages may be placed into subset(s) that make the LEBs eligible for garbage collection earlier than in prior art systems. Making LEBs with a large number of flushed pages eligible for earlier garbage collection effectively prevents undesired increases in write amplification and potential dead-lock situations arising from a lack of sufficient ready-to-use blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signal sper se, and energy per se.

In addition, although embodiments have been described that include use of a NAND flash memory, it should be appreciated that embodiments of the present invention can also be used with any other type of non-volatile random access memory (NVRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of garbage collection in a non-volatile memory, the method comprising:
    a controller of the non-volatile memory tracking identifiers of closed logical erase blocks (LEBs) of non-volatile memory for which programming has closed until after the LEBs are erased, wherein the tracking includes tracking a first subset of the closed LEBs that are ineligible for selection for garbage collection and tracking a different second subset of the closed LEBs that are eligible for selection for garbage collection;
    the controller continuously migrating closed LEBs from the first subset to the second subset over time;
    in response to closing a particular LEB, the controller placing an identifier of the particular LEB into one of the first and second subsets selected based on a first amount of dummy data programmed into the closed LEBs tracked in the first subset; and
    thereafter, in response to selection of the particular LEB for garbage collection, the controller performing garbage collection on the particular LEB.

2. The method of claim 1, wherein:
    the tracking includes the controller tracking the first subset in a first data structure and tracking the second subset in a different second data structure.

3. The method of claim 1, wherein:
    the placing includes placing the identifier of the particular LEB into the first subset based on both the first amount of dummy data and a second amount of dummy data in the particular LEB.

4. The method of claim 3, and further comprising the controller determining the second amount of dummy data in the particular LEB based on a number of consecutive physical pages containing no valid logical pages of data.

5. The method of claim 1, wherein:
    the particular LEB comprises a first LEB;
    the method further comprising:
        the controller, responsive to closing programming of a second LEB containing less than a threshold amount of dummy data, placing an identifier of the second LEB into a third subset if no invalidation of a logical page of data in the second LEB has been performed; and
        thereafter, the controller migrating the identifier of the second LEB from the third subset to the first subset in response to invalidation of a logical page of data in the second LEB.

6. The method of claim 1, and further comprising:
    the controller programming the particular LEB with one or more physical pages of dummy data responsive to at least a predetermined number of reads being made to the particular LEB while the particular LEB is open for programming.

7. The method of claim 1, and further comprising the controller selecting LEBs for wear leveling from both the first subset and the second subset.

8. A data storage system, comprising:
a controller for a non-volatile memory, wherein the controller is configured to perform:
the controller tracking identifiers of closed logical erase blocks (LEBs) of the non-volatile memory for which programming has closed until after the LEBs are erased, wherein the tracking includes tracking a first subset of the closed LEBs that are ineligible for selection for garbage collection and tracking a different second subset of the closed LEBs that are eligible for selection for garbage collection;
the controller continuously migrating closed LEBs from the first subset to the second subset over time;
in response to closing a particular LEB, the controller placing an identifier of the particular LEB into one of the first and second subsets selected based on a first amount of dummy data programmed into the closed LEBs tracked in the first subset; and
thereafter, in response to selection of the particular LEB for garbage collection, the controller performing garbage collection on the particular LEB.

9. The data storage system of claim 8, wherein:
the tracking includes the controller tracking the first subset in a first data structure and tracking the second subset in a different second data structure.

10. The data storage system of claim 8, wherein:
the placing includes placing the identifier of the particular LEB into the first subset based on both the first amount of dummy data and a second amount of dummy data in the particular LEB.

11. The data storage system of claim 10, wherein the controller is further configured to perform:
the controller determining the second amount of dummy data in the particular LEB based on a number of consecutive physical pages containing no valid logical pages of data.

12. The data storage system of claim 8, wherein:
the particular LEB comprises a first LEB;
the controller is further configured to perform:
the controller, responsive to closing programming of a second LEB containing less than a threshold amount of dummy data, placing an identifier of the second LEB into a third subset if no invalidation of a logical page of data in the second LEB has been performed; and
thereafter, the controller migrating the identifier of the second LEB from the third subset to the first subset in response to invalidation of a logical page of data in the second LEB.

13. The data storage system of claim 8, wherein the controller is further configured to perform:
the controller programming the particular LEB with one or more physical pages of dummy data responsive to at least a predetermined number of reads being made to the particular LEB while the particular LEB is open for programming.

14. The data storage system of claim 8, wherein the controller is further configured to perform:
the controller selecting LEBs for wear leveling from both the first subset and the second subset.

15. The data storage system of claim 8, and further comprising the non-volatile memory.

16. A computer program product, the computer program product comprising a computer readable storage medium having program instructions embodied therewith, the program instructions being executable by a controller of a non-volatile memory to cause the controller to perform:
a controller of the non-volatile memory tracking identifiers of closed logical erase blocks (LEBs) of non-volatile memory for which programming has closed until after the LEBs are erased, wherein the tracking includes tracking a first subset of the closed LEBs that are ineligible for selection for garbage collection and tracking a different second subset of the closed LEBs that are eligible for selection for garbage collection;
the controller continuously migrating closed LEBs from the first subset to the second subset over time;
in response to closing a particular LEB, the controller placing an identifier of the particular LEB into one of the first and second subsets selected based on a first amount of dummy data programmed into the closed LEBs tracked in the first subset; and
thereafter, in response to selection of the particular LEB for garbage collection, the controller performing garbage collection on the particular LEB.

17. The computer program product of claim 16, wherein:
the tracking includes the controller tracking the first subset in a first data structure and tracking the second subset in a different second data structure.

18. The computer program product of claim 16, wherein:
the placing includes placing the identifier of the particular LEB into the first subset based on both the first amount of dummy data and a second amount of dummy data in the particular LEB.

19. The computer program product of claim 18, wherein the program instructions further cause the controller to perform:
the controller determining the second amount of dummy data in the particular LEB based on a number of consecutive physical pages containing no valid logical pages of data.

20. The computer program product of claim 16, wherein:
the particular LEB comprises a first LEB;
the program instructions further cause the controller to perform:
the controller, responsive to closing programming of a second LEB containing less than a threshold amount of dummy data, placing an identifier of the second LEB into a third subset if no invalidation of a logical page of data in the second LEB has been performed; and
thereafter, the controller migrating the identifier of the second LEB from the third subset to the first subset in response to invalidation of a logical page of data in the second LEB.

* * * * *